April 3, 1928. 1,665,164
E. W. GARD ET AL
APPARATUS FOR SEPARATING LIQUID CONTAINING A
DISPERSED PHASE OF ANOTHER LIQUID
Filed Nov. 16, 1926
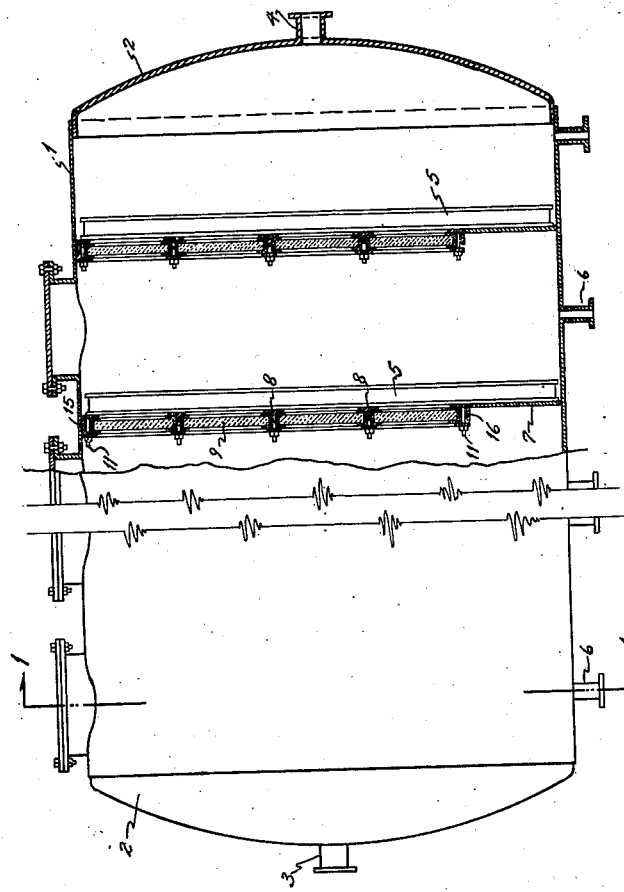
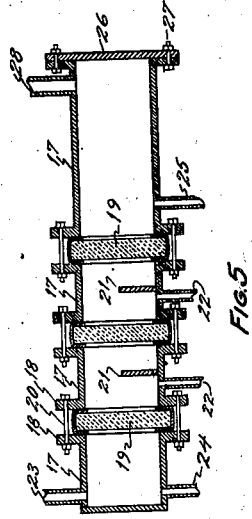
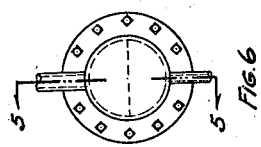
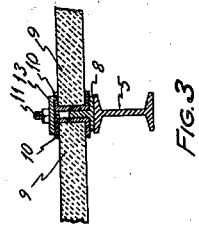
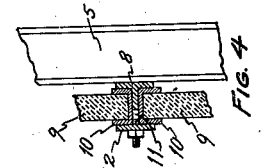
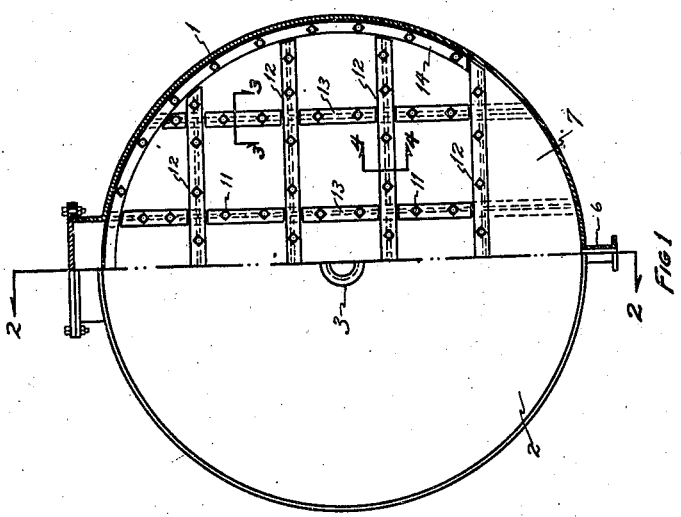
INVENTOR
*Carb W. Gard*
BY *Clair H. Aldridge*
*Hugh L. Walter*
*by L.N. Giles* ATTORNEY Patented Apr. 3, 1928.

1,665,164

UNITED STATES PATENT OFFICE.

EARLE W. GARD, OF LONG BEACH, BLAIR G. ALDRIDGE, OF LOS ANGELES COUNTY, AND HUGH J. MULTER, OF HUNTINGTON PARK, CALIFORNIA.

APPARATUS FOR SEPARATING LIQUID CONTAINING A DISPERSED PHASE OF ANOTHER LIQUID.

Application filed November 16, 1926. Serial No. 148,732.

It has been stated that oil containing water emulsified therein may be dehydrated by passing an emulsified oil through a bed of particles which form capillary passages. Thus, the oil may be dehydrated by passing the same through a filter-bed composed of diatomaceous earth, silica carbons, or matted felt.

We have found, however, that processes of this character are inefficient, and in fact, so inefficient as to be commercially unprofitable. This we believe to be due to the channeling effect caused by the fact that the particles forming the capillary passages are displaced and the capillarity of the passages are soon destroyed by the forming of large channels therethrough. It has been proposed to filter the oil through cloth to obtain this same break. We find, however, that cloth is ineffective due, we believe, to the fact that such capillary passages as may be present in the cloth are too short to obtain the desired de-emulsification.

We find that these difficulties are overcome by using foraminous blocks formed of capillary passages which will not displace and which will have considerable length. We may use, for instance, 200 mesh screens built up in considerable thickness, for instance one inch, approximately one inch blocks of capillary tubes held together by means of a matrix or any other mechanical means, or porous blocks containing capillary passages, such as natural pumice rock cut into slabs, or "filtros" plates which are made by fusing particles of silica together at the point of contact of the silica, to provide a solid plate containing capillary passages. Such a process is described in Patents 1,117,601 and 1,118,441.

The process of separation, we believe to be due to the selective adhesion or adsorption of one phase with respect to another. In separating oil from acid-sludge or oil from water, we believe that the sludge or water, as the case may be, adheres to the surface of the capillary passages more than the oil. The globules of acid-sludge or water, are therefore retarded by adhesion, while the oil passes through the capillary passages. The retarded phase is built up to form larger globules by the agglomeration of these fine particles. When the particles become large enough they are detached from the wall of the capillary passage and move on with the oil and when they reach the space beyond the plate they gravitate to the bottom and separate from the oil in a layer. By placing the plates vertically, or on a vertical incline, the agglomerated phase will gravitate downward and a substantially immediate separation results, giving a maximum efficiency. This is the preferred arrangement. A horizontal arrangement of the plates causes the agglomerated phase to be carried on with the main stream and re-emulsification to occur. However, by causing an immediate separation of the agglomerated phase and withdrawing the same to a separate chamber before passage to the next plate, this re-emulsification is avoided.

The efficiency of the process is augmented by arranging these filter or coagulation plates in series, passing the oil through the plates and separating the coagulated phase between each plate. For small units of 100 barrels per day operating at pressures of about twenty pounds to the square inch, we find that the filter composed of single plates eight inches in diameter is sufficient. An apparatus of this kind is shown in Figures 5 and 6. However, for larger units it is necessary to use larger plates. It is impractical to form plates greater than one foot square. We find that it is necessary to build these plates in the form of a gridwork.

The invention will be better understood by reference to the accompanying drawing, which shows Figure 1, a part sectional end view of the filter. Figure 2 is a part sectional view taken on line 2—2 of Figure 1. Figure 3 is a sectional view taken along line 3—3 of Figure 1. Figure 4 is a sectional view taken along line 4—4 of Figure 1. Figure 5 is a sectional view of a modification of the filter. Figure 6 is an end view of Figure 5. In Figures 1, 2, 3 and 4, 1 is a shell containing a dished head 2, inlet 3 and outlet 4. At points longitudinally spaced of this shell are a number of gridworks composed of vertical I beams 5, spaced apart on a plane perpendicular to the longitudinal axis of the drum. The I beams are welded to the drum or attached in any manner. Intermediate these I beams are draw-offs 6 and manholes, which manholes are covered by plates held in place by bolts. Welded to the I beams is a baffle 7, formed as a sector of the circle having its maximum height approximately 1/5 of the diameter of the shell. Upon these I beams are welded a grid formed of T sections 8. This grid is formed so that the blocks 9 covered with a lead gasket 10 shall fit into the squares formed by the T sections 8. At spaced points along these T sections are welded a plurality of studs 11. These blocks are held in place by retaining strips 12 which run on cords perpendicular to the I beams, and also by shorter retaining strips 13 which run perpendicular to the retaining strips 12, and a partially circular strip 14 which is placed around the edge of the grid, touching the lowest strip 12. The blocks on the edge of the grid are so cut as to fit into the circular sections of the drum. Angle section 15, which is formed partially circular in the same manner as 14, is welded to the I beams 5 and is welded to the drum 1. This angle acts as a means for holding the stud 11 attached thereto. A similar angle section 16 is welded across the I beam 5 perpendicular thereto and acts as a retaining means for the stud 11 welded thereto. The form of filter shown in Figures 5 and 6 is composed of a plurality of sections 17 formed with flanges 18. Between each of the flanges are held plates 19 by means of bolts 20. Between these plates are baffles 21, between the baffles 21 and the plates 19 are draw-offs 22. The first section having an inlet 23 has a draw-off 24. The last section is made elongated and contains no baffles but it does contain a draw-off 25. The end section is blanked off by plate 26 held in place by bolts 27, and has a draw-off 28.

The above is not to be taken as limiting our invention, but merely as illustrative of the best manner of carrying out our invention, which we claim to be:

1. An apparatus for separating one liquid dispersed in another, a chamber, an inlet at one end of said chamber and an outlet at the other end of said chamber, a plurality of grids in said chamber, means for attaching a plurality of foraminous plates to said gridwork, a liquid outlet between said grids.

2. An apparatus for separating one liquid dispersed in another, a chamber, an inlet at one end of said chamber and an outlet at the other end of said chamber, a plurality of grids in said chamber, means for attaching a plurality of foraminous plates to said gridwork, a liquid outlet between said grids, and baffles attached to said chamber.

3. An apparatus for separating one liquid dispersed in another which comprises a chamber, a liquid inlet in one end of said chamber, a liquid outlet at the other end of said chamber, a plurality of vertically spaced grids in said chamber, a plurality of porous plates attached to said grids, means for sealing each of said plates, means for withdrawing liquid between said grids, and a baffle attached to the bottom of said chamber.

4. An apparatus for dehydrating oil, comprising a chamber, having an inlet at one end and an outlet at the other end, a plurality of grids in said chamber, a means for attaching a plurality of foraminous blocks to said grids and means for withdrawing liquid between said grids.

5. An apparatus for separating acid sludge from an oil which has been treated with an acid, comprising, successive chambers, the first chamber having a liquid inlet and the last chamber having a liquid outlet, a plurality of vertically spaced grids in said chambers, a plurality of porous plates attached to said grids, means for withdrawing liquid between said grids, and a baffle attached to the bottom of each chamber.

In testimony whereof we affix our signatures.

EARLE W. GARD.
BLAIR G. ALDRIDGE.
HUGH J. MULTER.